Feb. 10, 1970 HIDEO TAI ET AL 3,494,730
PROCESS FOR PRODUCING CADMIUM TELLURIDE CRYSTAL
Filed March 20, 1967
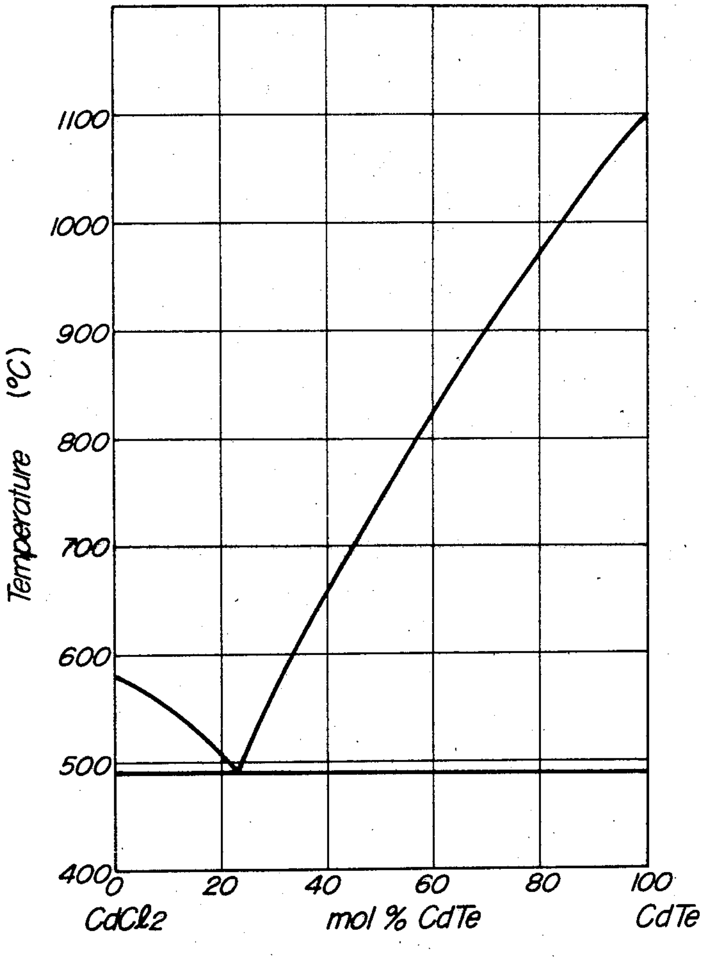

United States Patent Office 3,494,730
Patented Feb. 10, 1970

3,494,730

PROCESS FOR PRODUCING CADMIUM TELLURIDE CRYSTAL

Hideo Tai, Toyonaka-shi, and Iwao Teramoto, Ibaraki-shi, Japan, assignors to Matsushita Electronics Corporation, Kadoma-shi, Osaka, Japan, a corporation of Japan Filed Mar. 20, 1967, Ser. No. 624,436
Claims priority, application Japan, Mar. 26, 1966, 41/19,125
Int. Cl. C01g *11/00*
U.S. Cl. 23—50 14 Claims

ABSTRACT OF THE DISCLOSURE

Equimolar metallic cadmium and tellurium each in an amount of more than 24 mol percent relative to cadmium telluride equivalent are mixed with cadmium chloride. The mixture thereof is fused at a temperature of from 490° to 1,090° C., for example, at 600° C. Thereafter, the resultant fused mixture is cooled to recover cadmium telluride crystal therefrom. Accordingly, cadmium telluride may be synthesized even at a temperature below the melting point of cadmium telluride, thereby to carry out single crystallization and to obtain epitaxial growth layer of cadmium telluride.

The present invention relates to the production of crystalline cadmium telluride.

In the production of single crystal of cadmium telluride, there has been usually employed a process in which equiatomic cadmium and tellurium metals are placed in a quartz glass container which is evacuated, sealed and heated to 800°–900° C. to carry out the reaction. Because cadmium telluride is a solid in the above temperature range, the reaction cannot be perfectly carried out and the temperature must be elevated to a temperature higher than 1,090° C., the melting point of cadmium telluride. However, the vapor pressure of cadmium, for example, at 1,150° C. is 10 atm.; and therefore, if the temperature is rapidly elevated, there may be involved a risk of exploding the container because of the high vapor pressure produced by unreacted cadmium. For the above reason, the temperature must be raised very slowly. Furthermore, a small amount of free solid insoluble cadmium or tellurium may frequently be deposited on the surface of cadmium telluride solid resulting from the reaction. The cadmium or tellurium so deposited must be removed by dissolving same in acid or the like. The thus obtained polycrystalline cadmium telluride is placed in a quartz glass boat. The boat and a small amount of cadmium are placed in a quartz glass tube which is exhausted and sealed. The boat is placed in the known zone-melting furnace and subjected to zone-melting to carry out single-crystallization. The excess cadmium sealed in the quartz glass tube is intended to adjust the vapor pressure of cadmium within said quartz glass tube by employing a furnace with two heating zones. When the partial pressure of cadmium is too low, evaporation of cadmium telluride takes place and the yield is lowered. And when the partial pressure is too high, free cadmium or bubble is formed within the solidified cadmium telluride causing the crystal to be imperfect.

As described above, the conventional process for producing single crystal of cadmium telluride not only involves complicated procedures but also requires expensive multiple furnaces, one of which should be capable of heating to a temperature as high as 1,100° C. and of being accurately controlled. Moreover, it requires a driving apparatus for the purpose of moving a sample container slowly and calmly from furnace to furnace.

An object of the present invention is to provide a new process for producing polycrystal or single crystal of cadmium telluride at a remarkably low temperature as compared with that of the conventional process and by employing simple apparatus with simplified procedures.

The figure shows an equilibrium phase diagram of cadmium telluride and cadmium chloride. As can be appreciated from the figure in the binary system of cadmium telluride and cadmium chloride, no intermediate compound is present, and the system has the eutectic point at 490° C. at the composition of about 24 mol percent of cadmium telluride. When a mixture of cadmium chloride and cadmium telluride is maintained at a temperature higher than that of the liquidus line corresponding to the composition thereof, a single phase liquid is obtained. In this case, however, on admixing cadmium chloride with cadmium telluride, instead of employing the cadmium telluride in the form of compound of cadmium with tellurium, respective equimolar amounts of metallic tellurium and metallic cadmium corresponding to the amount of the cadmium telluride can also be employed. It has been clarified that a single phase solution can be obtained when the mixture as mentioned above is heated at a temperature higher than that of liquidus line corresponding to the composition thereof in the same manner as in the case where cadmium telluride is admixed with cadmium chloride. If the composition of the solution easily obtained at a temperature lower than the melting point of cadmium telluride as described above contains excess cadmium telluride as compared with the eutectic composition as shown in the figure, a solid phase cadmium telluride is precipitated at a temperature of liquidus line when the solution is cooled. In this case, in the composition of the remaining liquid phase, the molar fraction of cadmium chloride increases in proportion to the amount of cadmium telluride precipitated and cadmium telluride increases with progress of cooling, and the composition of liquid phase moves along the liquidus line to finally reach the eutectic point. At a temperature below the eutectic temperature, solid phase cadmium telluride and solid phase cadmium chloride are simultaneously precipitated, whereby the liquid phase does not exist any longer. Accordingly, if cooling of the liquid phase is slowly effected so as to be maintained in a state as near as possible to the thermal equilibrium, precipitation of solid phase cadmium telluride can be effected at a velocity which satisfies the conditions necessary for single-crystallization.

After cooling the system to an eutectic temperature, rapid eutectic reaction takes place even when slowly cooled, thereby to produce polycrystalline powder. The cooling, therefore, is effected at a high speed. In the solid obtained by cooling the system to room temperature, besides single crystal of cadmium telluride a mixture of fine grains of cadmium telluride and cadmium chloride is present as eutectic substance. When the mixture is poured in water kept at a temperature above room temperature, cadmium chloride phase dissolves in water and simultaneously cadmium chloride deposited on the surface of cadmium telluride is gradually removed therefrom, and therefore it is possible to easily separate the mixture into single crystal of cadmium telluride and powder.

According to the present process, it is possible to easily synthesize cadmium telluride at a far lower temperature, for example 600° C., than 1,090° C., the melting point of pure cadmium telluride, thereby to carry out single crystallization without the necessity of complicated operation and expensive apparatus.

As described above, since all the operations can be carried out at a temperature lower than 600° C., the contamination by impurity from the container at a high temperature, which has heretofore been inevitable, can be prevented. At the same time, a glass container having low softening temperature can also be employed in place of an expensive quartz glass container. Moreover, in an equimolar mixture of metallic tellurium and metallic cadmium to be admixed with cadmium chloride or a fine grain powder of cadmium telluride, a single crystal of cadmium telluride which is larger than the above grains is previously mixed. When the temperature of mixture is elevated to a slightly higher level than the liquidus lines temperature, the liquid phase coexists therewith leaving the single crystal unaffected. Thereafter, when the mixture is cooled, the precipitated cadmium telluride can be epitaxially grown on the surface of the single crystal. In this case, besides an equimolar mixture of metallic tellurium and metallic cadmium or powder of cadmium telluride as first prepared, a surface layer of single crystal of cadmium telluride also dissolves to expose a clean crystal surface suitable for epitaxial growth, thereby to provide an excellent substrate as a seed crystal without necessitating any preliminary process. In this process, it is possible to carry out epitaxial growth by previously dissolving other substances than the seed crystal, incorporating the seed crystal thereinto and cooling the resultant mixture. According to this process, cadmium telluride crystals suitable for use in a very high efficient photovoltaic cell, semiconductor laser and injection type electroluminescence device can be easily prepared, as p-n junction is produced by dipping seed crystal of one conduction type into the above-described cadmium telluride solution to produce another conduction type epitaxial layer.

Instead of precipitating solid phase cadmium telluride by cooling cadmium chloride solution containing equimolecular weight of tellurium and cadmium relative to cadmium telluride along the liquidus line, it is possible to precipitate solid phase cadmium telluride at the composition crossing the liquidus line by evaporating cadmium chloride having a higher vapor pressure while maintaining the temperature at a fixed level and moving the concentration of equimolecular weight of tellurium and cadmium relative to cadmium in the solution toward the higher side. In this case, the vapor pressure of cadmium chloride solution decreases in proportion to an increase in the amount of equimolecular weights of tellurium and cadmium relative to cadmium telluride contained in the solution. In order to control velocity of the precipitation of solid phase cadmium telluride in the vicinity of the liquidus line the evaporation velocity from the liquid phase in controlled. In the closed system, evaporation velocity is dominated by the velocity of diffusion of the vapor flowing from the surface of liquid phase positioned at a high temperature zone in the system to a low temperature zone. Accordingly, it is possible to carry out precipitation of cadmium telluride at a suitable velocity for single crystallization by adjusting the difference between the temperature of the surface of liquid phase and the lowest temperature in the system. Furthermore, in open system, the control of velocity of vapor flowing out of the system can be easily effected by the various known procedures.

As described hereinabove, according to the present invention, besides sealed tube with reduced pressure, one end open tube can also be employed and thereby remarkably reduce the cost of equipment and simplify the operations as compared with conventional processes for producing cadmium telluride.

The present invention will be illustrated by referring to the following examples.

EXAMPLE 1

Into a one end closed quartz glass tube having inside diameter of 1.5 cm, 4,091 g. of cadmium chloride anhydride, 1.284 g. of metallic cadmium and 1.399 g. of metallic tellurium were filled with mixing. After maintaining the quartz tube at 650° C. for 60 minutes, it was cooled to 500° C. at a cooling rate of 0.5° C. per minute. The quartz tube was taken out of the electric furnace at 500° C., and allowed to cool to room temperature. The content of the quartz tube was sufficiently rinsed with hot water to recover cadmium telluride single crystals. As a result, several pieces of single crystals each having a diameter of about 5 mm. were obtained.

EXAMPLE 2

Into a one end closed quartz glass tube having inside diameter of 1.5 cm., 8.172 g. of cadmium chloride anhydride powder, 3.774 g. of fine grain powder of cadmium telluride and one piece of cadmium telluride single crystal weighing 1.257 g. were placed with mixing. After exhausting the quartz tube with a vaccum pump, it was sealed off so that the tube length was 20 cm. One end of the sealed tube was placed in a small electric furnace. When it was heated to 650° C., the mixed powders and the surface of single crystal were fused. The temperature at the upper end of the tube was 500° C. After maintaining the lower end of the tube at 560° C. for 60 minutes, it was cooled at a cooling rate of 0.5° C. per minute. After 2 hours since the starting of cooling, the tube was taken out of the furnace at 500° C., and allowed to cool to room temperature. The content of the quartz tube was sufficiently rinsed with hot water to recover cadmium telluride crystal. Observing the cross section of the single crystal thus obtained with an optical microscope, it has been found that epitaxial growth layer of cadmium telluride having thickness of 10$\mu$ was formed on the single crystal.

We claim:

1. A process for producing cadium telluride crystal which comprises mixing solid metallic cadium, solid metallic tellurium, and solid cadmium chloride, the former two being equimolar to each other and in an amount of more than 24 mol percent as cadmium telluride, fusing the mixture at a temperature of 490 to 1090° C. and then slowly cooling the fused mixture to precipitate cadmium telluride crystal.

2. Process according to claim 1 wherein said mixture is fused under vacuum in a sealed container.

3. Process according to claim 1 wherein said mixture is fused in a container open to the atmosphere.

4. Process according to claim 1 further comprising evaporating cadmium chloride within said temperature range simultaneously with said cooling of the fused mixture.

5. Process for producing cadmium telluride crystal which comprises mixing solid metallic cadmium, solid metallic tellurium, and solid cadmium chloride, the former two being equimolar to each other and in an amount of more than 24 mole percent as cadmium telluride, fusing the mixture at a temperature of 490 to 1090° C. and then evaporating cadmium chloride while maintaining the fused mixture within said temperature range to precipitate cadmium telluride crystal.

6. Process according to claim 5 wherein said mixture is fused in an open container.

7. Process according to claim 5 wherein said mixture is fused under vacuum in a sealed container and the cadmium chloride is evaporated by maintaining two temperature zones within said container, the fused mixture being maintained in the zone of higher temperature.

8. Process for producing cadmium telluride crystal which comprises mixing more than 24 mol percent of solid cadmium telluride with solid cadmium chloride, fusing the mixture at a temperature of 490 to 1090° C. and then slowly cooling the mixture to precipitate cadmium telluride crystal.

9. Process according to claim 8 wherein said mixture is fused under vacuum in a sealed container.

10. Process according to claim 8 wherein said mixture is fused in a container open to the atmosphere.

11. Process according to claim 8 further comprising evaporating cadmium chloride with said temperature range simultaneously with said cooling of the fused mixture.

12. Process for producing cadmium telluride crystal which comprises mixing more than 24 mol percent of solid cadmium telluride with solid cadmium chloride, fusing the mixture at a temperature of 490 to 1090° C. and then evaporating cadmium chloride while maintaining the fused mixture within said temperature range to precipitate cadmium telluride crystal.

13. Process according to claim 12 wherein said mixture is fused in an open container.

14. Process according to claim 12 wherein said mixture is fused under vacuum in a sealed container and the cadmium chloride is evaporated by maintaining two temperature zones within said container, the fused mixture being maintained in the zone of higher temperature.

References Cited

UNITED STATES PATENTS

| | | | |
|---|---|---|---|
| 2,643,196 | 6/1953 | Allan et al. | 23—50 X |
| 3,006,720 | 10/1961 | L'Heureux | 23—50 |
| 3,342,546 | 9/1967 | Reisman et al. | 23—50 |

OTHER REFERENCES

Prokator: "Selenium and Tellurium Abstracts," vol. 9, 1968, Abstract No. 8691.

HERBERT T. CARTER, Primary Examiner

U.S. Cl. X.R.

23—295, 301, 204